United States Patent Office 3,321,029
Patented May 23, 1967

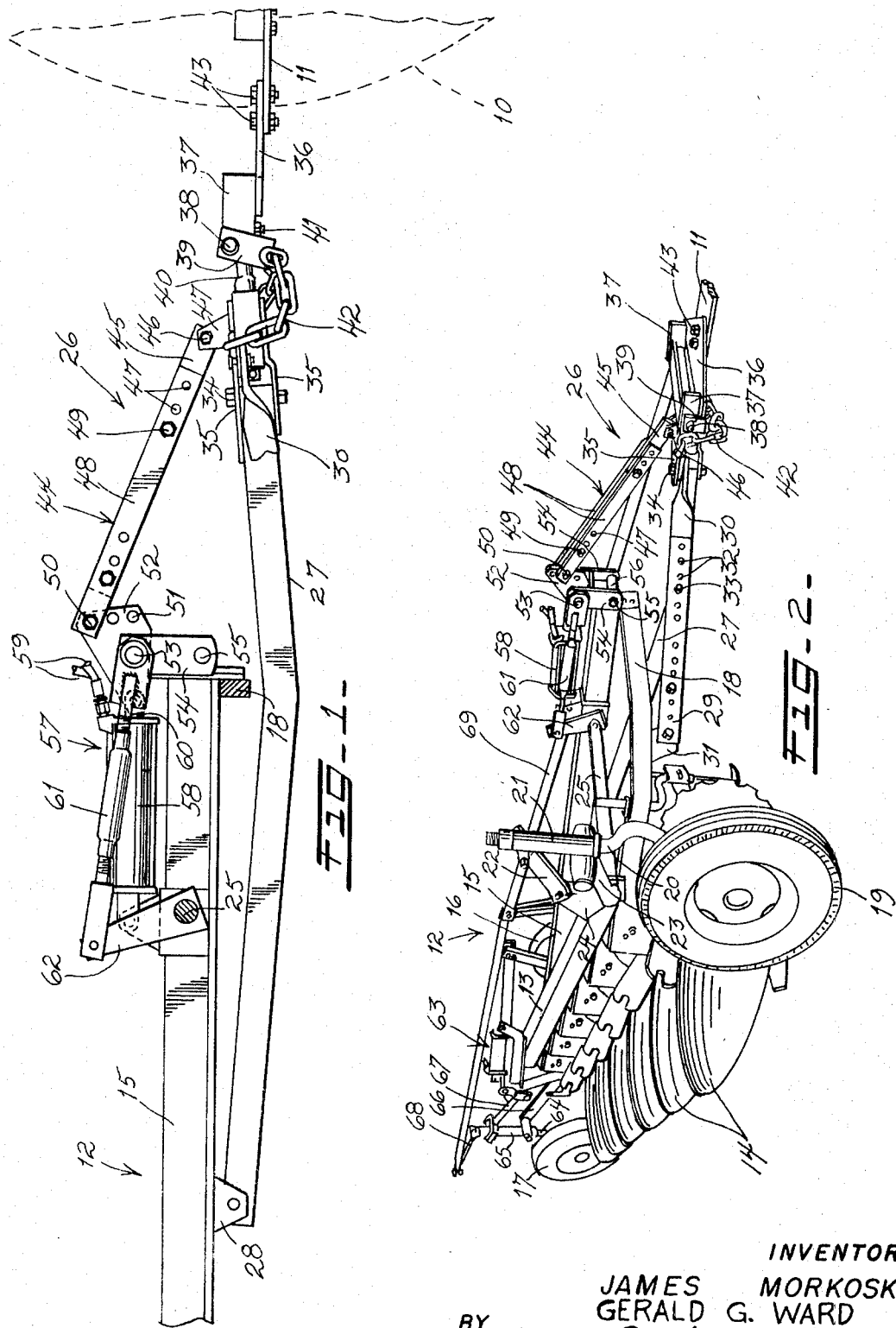

3,321,029
HYDRAULICALLY CONTROLLED PLOW
James Morkoski, Clarendon Hills, and Gerald G. Ward, Naperville, Ill., assignors to International Harvester Company, Chicago, Ill., a corporation of Delaware
Filed Sept. 10, 1964, Ser. No. 395,426
8 Claims. (Cl. 172—328)

This invention relates to agricultural implements and particularly to plows. More specifically, the invention concerns novel control means for a multi-bottom plow of the tractor propelled, trail-behind type.

The advantages of providing a power lifting apparatus on a tractor for lifting and transporting an entire implement or for lifting the front end of an implement such as a plow have long been known. The operational advantages of a trail-behind plow which can float relative to the tractor to follow the contour of the ground and which can swing laterally to track with the propeling vehicle are also well known. However, where the implement is connected to a conventional two or three point lifting hitch the last mentioned advantages are sacrificed, and the present invention has for its object the provision of an implement such as a plow of novel construction adapted to combine the advantages inherent in tractor mounted and trail-behind plows.

Another object of the invention is the provision of an improved moldboard plow incorporating novel means for adjusting the depth of operation as well as for moving the plow between operating and transport positions.

A further object of the invention is the provision of a plow of the trail-behind type including a frame of generally triangular conformation wherein the plow is supported at two apices of the triangle by wheels arranged to ride in the furrow formed by the earthworking units, and at its third apex by a tractor drawbar, the connection of the plow frame to the drawbar including a hyradulic cylinder adapted to hold the frame in a selected fixed position relative to the tractor drawbar and operable to vary the vertical relation of the frame to the drawbar and the relation of at least one of the wheels to the plow frame.

Other objects and advantages of the invention will become clear from the following detailed description when read in conjunction with the accompanying drawings wherein:

FIGURE 1 is an enlarged sectional detail in side elevation showing the front end of a plow incorporating the features of this invention attached to the drawbar of a tractor; and FIGURE 2 is a view in perspective of a plow having incorporated therein control means according to this invention.

The numeral 10 designates one of the rear wheels of a tractor having a drawbar 11 adapted to be held in a fixed vertical position, to which is connected the multi-bottom moldboard plow shown in the drawings.

The plow shown in the drawings has a main frame 12 which includes a diagonally extending beam 13 upon which plow units 14 are mounted. The main frame 12 is generally triangular, beam 13 converging rearwardly and forming one side of a triangle with another beam 15 to form one of the apices of the triangle. A rearward extension of beam 13 has mounted thereon a wheeled truck including a land wheel 16 and a rear furrow or tail wheel 17.

The third side of the triangle includes a forward cross member 18 forming with beam 13 an apex of the triangle having a ground support provided by a front furrow wheel 19. Wheel 19 is mounted upon the lower end of a vertical spindle 20 rotatable in a bearing 21 pivotally connected to the ends of a pair of verticaly spaced links 22 and 23, the rear ends of which are pivoted upon a bracket 24 carried by beam 13. Lower link 23 is in the form of a crank provided at the end of a shaft 25 supported by bracket 24 and beam 15, it being understood that rocking of shaft 25 swings links 22 and 23 and wheel 19 verticaly relative to the implement frame to raise and lower that portion of the implement.

The third apex of the triangle forming frame 12 comprises the juncture of beam 15 and cross member 18, this portion of the frame being unsupported by a wheel. A hitch frame 26 for connecting the implement to the tractor includes a bar 27 pivoted upon a lug 28 affixed to and depending from beam 15, and a pair of straps 29 and 30, strap 29 being pivoted upon a lug 31 secured to cross-member 18. The straps 29 and 30 are adjustable to vary the effective length thereof by the provision therein of registering openings 32 in which are received bolts 33.

The forward end of strap 30 is pivotally connected by a pin 34 with a pair of plates 35, pin 34 also providing a pivotal connection for the forward end of hitch bar 27.

A hitch plate 36 is provided with spaced lugs 37 pivotally mounted at 38 upon laterally spaced bars 39 affixed to a member 40 carried by plates 35. Member 40 and lugs 39 are pivoted at 38 to accommodate vertical swinging movement of the implement relative to the drawbar 11 and hitch plate 36. Member 40 is likewise pivoted upon a pin 41 to accommodate lateral swinging of the implement relative to drawbar 11, such lateral swinging being limited by the provision of a pair of chains 42 connected to the opposite sides of one of the plates 35 and to lugs 39. Plate 36 is affixed to the drawbar 11 by bolts 43.

The front end of an implement of this type is customarily raised and lowered to adjust the operating depth of the plow or to move it between operating and transport position by attaching the plow hitch to a conventional power operated hitch of the two or three point type with which many tractors are provided.

The tractor drawbar 11 serves as a support for the forward side of the plow opposite furrow wheel 19, and operating depth of the implement is controlled by mechanism including a link 44 formed of a strap 45 pivoted at 46 upon a pair of lugs 47 carried by one of the plates 35. Suitable openings are provided in strap 45 to register with openings 47 in a pair of straps 48 receiving strap 45 therebetween and adjustably secured thereto by bolts 49. Straps 48 are pivoted upon a pin 50 carried in a selected one of a plurality of vertically spaced openings 51 in an arm 52 affixed to a shaft 53, pin 50 being shown as located in the uppermost opening 51 in FIGURE 1 and in the middle opening 51 in FIGURE 2.

Shaft 53 is mounted in the upper ends of a pair of arms 54, the lower ends of which are mounted upon a shaft 55 carried in a sleeve 56 secured, as by welding, to the forward end of beam 15. Inasmuch as drawbar 11 is anchored to the tractor 10, the front end of the plow can be raised and lowered relative to the tractor and the hitch structure 26 by rocking arms 52 and 54 about the axis of shaft 55. This is accomplished by the provision of a hydraulic jack 57 comprising a cylinder 58 of the two-way type receiving fluid under pressure through hose lines 59 and having a piston rod 60 slidable therein and pivotally connected to arm 52. Cylinder 58 is pivotally anchored to beam 15. Extension and retraction of the piston rod 60 in the cylinder 58 thus rocks arms 54 and link 44 to vertically move the plow carrying main frame about the pivotal connections of the hitch frame 26 thereto. Rocking of arms 54 to raise and lower the frame of the plow relative to the tractor drawbar is transmitted to front furrow wheel 19 through an adjustable link in the form of a turnbuckle 61 having its forward end pivotally connected to shaft 53 and its rear end pivotally connected to an arm 62 mounted on shaft 25, rocking of which causes vertical swinging of links 22 and 23 and of wheel 19 relative to the plow frame.

In the plow shown in the drawings the rear furrow wheel 17 and land wheel 16 are preferably controlled by hydraulic power transmission mechanism indicated at 63, the details of construction and operation of which form no part of this invention. However, it may be noted that rear furrow wheel 17 is mounted upon a vertical spindle 64 carried in a bearing 65 supported by vertically swinging links 66 and 67 mounted on the rear of the implement frame. The upper end of spindle 64 has secured thereto a steering arm 68 connected to longitudinally extending link means 69, the forward end of which is pivotally connected to plate 36 so that turning of the tractor is transmitted through link 69 to steer the rear furrow wheel 17.

Link 44 is adjustable to accommodate tractors having drawbars of different height, and it is possible to lift the implement frame to the same transport height, irrespective of the depth of operation of the earthworking units 14, by adjusting the effective length of the lever formed by arms 52 and 54 about the axis of shaft 55. This is accomplished by selectively connecting link 44 through pin 50 to one of the openings 51 in arm 52. For example, with link 44 connected to the uppermost opening in arm 52 the greatest amount of lift for the implement frame is achieved when the earthworking units are set for deepest plowing, the lowermost opening 51 being utilized when the plow is set for relatively shallow depth plowing.

It is believed that the construction and operation of the novel hydraulically controlled implement of this invention will be clearly understood from the foregoing description. It should likewise be understood that the invention has been described in its preferred embodiment and that modifications may be made therein without departing from the spirit of the invention or the scope of the appended claims.

What is claimed is:

1. The combination with a tractor having a drawbar adapted to be held in a vertically fixed position, of a multi-bottom plow having a generally triangularly shaped plow-carrying main frame, wherein two apices of the triangle are spaced apart generally transversely of the direction of travel, wheel means supporting the plow at one of said apices and vertically movable relative to said main frame, and means supporting the plow at the other of said apices on the tractor drawbar, comprising a hitch frame pivotally connected at its rear end to said main frame for vertical swinging relative thereto, means connecting the forward end of said hitch frame to said drawbar in fixed vertical relation thereto to support the plow at said other apex of said triangle, and means for holding said main frame and said hitch frame in fixed vertical relation including means for vertically adjusting the main frame relative to the hitch frame, comprising a lever mounted on said main frame and linkage connecting said lever to said hitch frame, and a hydraulic jack mounted on said main frame operatively connected to said lever for rocking the latter to vertically adjust said hitch frame relative to said main frame.

2. The invention set forth in claim 1, wherein said linkage includes a lever arm on said main frame and operatively connected to said cylinder for rocking the lever arm by activation of the cylinder, and a thrust link connecting said lever arm to said hitch frame, said lever arm being adjustable in length to vary the operating depth of the plow.

3. The invention set forth in claim 1, wherein means are provided for pivotally connecting said hitch frame to said tractor drawbar to accommodate vertical and lateral swinging of the plow relative to the tractor.

4. The invention set forth in claim 2, wherein a shaft is rockably mounted on said main frame and operatively connected to said front furrow wheel to raise and lower the latter upon rocking said shaft, said shaft having an arm thereon connected to said lever arm for transmitting the rocking of said lever arm to said shaft.

5. The invention set forth in claim 4, wherein the connection of said shaft arm to said lever arm is a link adjustable in length to independently rock said shaft and vertically adjust said front furrow wheel.

6. The invention set forth in claim 2, wherein said lever arm is provided with a plurality of vertically spaced openings at different distances from the fulcrum of said lever on the main frame, said linkage being selectively connectable to said lever at one of said openings to compensate for adjustments in operating depth of the plow and provide for lifting the implement to a constant height for transport.

7. The combination with a tractor having a drawbar adapted to be held in a vertically fixed position, of a multi-bottom plow having a generally triangularly shaped plow-carrying main frame, wherein two apices of the triangle are spaced apart generally transversely of the direction of travel, wheel means supporting the plow at one of said apices and vertically movable relative to said main frame, and means supporting the plow at the other of said apices on the tractor drawbar, comprising a hitch frame pivotally connected at its rear end to said main frame for vertical swinging relative thereto, means connecting the forward end of said hitch frame to said drawbar in fixed vertical relation thereto to support the plow at said other apex of said triangle, and means for holding said main frame and said hitch frame in fixed vertical relation including means for vertically adjusting the main frame relative to the hitch frame, comprising lever means mounted on said main frame and power transmission means connecting said lever means to said hitch frame, and a hydraulic jack mounted on said main frame operatively connected to said lever means for rocking the latter to vertically adjust said hitch frame relative to said main frame.

8. The invention set forth in claim 7, wherein connecting means is provided between said hydraulic jack and said wheel means for vertically adjusting the latter simultaneously with said hitch frame.

References Cited by the Examiner

UNITED STATES PATENTS

| | | | |
|---|---|---|---|
| 2,691,930 | 10/1954 | Forgy | 172—328 |
| 3,236,313 | 2/1966 | Arnold et al. | 172—328 |

ANTONIO F. GUIDA, *Acting Primary Examiner.*

ABRAHAM G. STONE, *Examiner.*

J. R. OAKS, *Assistant Examiner.*